(No Model.)
W. F. KINGERY & J. B. CAVANAUGH.
DERRICK FOR SLAUGHTERING ANIMALS.
No. 448,054. Patented Mar. 10, 1891.
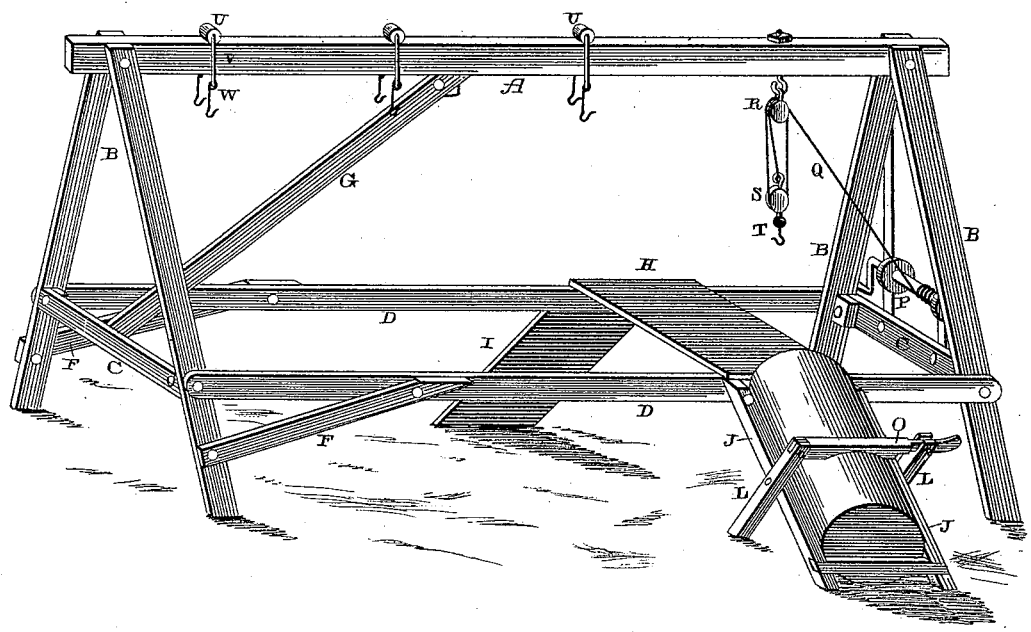
Witnesses:
Inventors

United States Patent Office.

WILLIAM FRANKLIN KINGERY AND J. BURDETT CAVANAUGH, OF GREEN FIELD, IOWA.

DERRICK FOR SLAUGHTERING ANIMALS.

SPECIFICATION forming part of Letters Patent No. 448,054, dated March 10, 1891.

Application filed December 16, 1890. Serial No. 374,937. (No model.)

*To all whom it may concern:*

Be it known that we, WILLIAM FRANKLIN KINGERY and J. BURDETT CAVANAUGH, of Greenfield, in the county of Adair and State of Iowa, have invented certain new and useful Improvements in Derricks for Slaughtering Animals; and we do hereby declare the following to be a full, clear, and exact description of the invention, such as will enable others skilled in the art to which it pertains to make and use it, reference being had to the accompanying drawing, which forms part of this specification.

Our invention relates to an improvement in derricks for slaughtering animals; and it consists in the combination of the top beam, the legs by which it is supported, the braces applied to the legs and to the top beam for rendering them rigid, the platform, and the tank and tank-frame, as will be more fully described hereinafter.

The object of our invention is to provide a folding derrick, which is designed to be used more especially by farmers in slaughtering animals of all kinds, and which when no longer needed for immediate use can be folded up and packed away.

The accompanying drawing represents a perspective of a derrick which embodies our invention.

A represents the top beam upon which the animals are to be hung, and which beam is to be supported by two pairs of legs B, which are pivoted thereto. These legs are connected together by the end braces C, the side arms D, and the side braces F. The side arms and side braces are to be removed whenever cattle or other heavy animals are to be slaughtered. When cattle are to be slaughtered, the side arms D and braces F are removed, and then the middle brace G is secured to the under side of the top beam and to the end C at the opposite end from the hoisting apparatus. If hogs and sheep are to be slaughtered, the middle brace G is not used, but the side arms and side braces are. Placed upon the top of the side arms is the platform H, and placed against one end of the platform is the inclined plank I, up which the slaughtered animals are drawn by the hoisting apparatus. Secured to the side arm opposite the end of the platform are the two legs or supports J, and pivoted or otherwise secured to these legs at any angle thereto are the supports L, which form the tank-frame and which are connected at their upper ends by a cross-lever O. The tank, which is formed of any suitable material, contains the hot water which is to be used in scalding the animals.

The hoisting apparatus consists of a drum P, provided with a crank, around which a rope Q is passed. This rope passes up over the double block R and around the single block S, which is provided with a swivel-hook T. Upon the top of the beam are placed the rollers U, from which extend the hangers V, to the outer ends of which the hooks W are fastened. Upon these hooks W the slaughtered animals are hung as fast as they are finished, and then the animals are moved back out of the way, the middle brace G not being used, as before stated, except when large animals, like beeves, are being killed.

When the derrick is not needed for immediate use, the platform, draw-tank, side arms, and side and middle braces are removed, and the legs are then folded up under the beam.

Having thus described our invention, we claim—

1. In a slaughtering apparatus, the supporting-legs, the beam supported at their upper ends, the side arms, a platform, and a tank or receptacle at one end of the platform having its open end substantially in a plane with the surface of the said platform, whereby the animals may be passed from the platform into the tank, substantially as shown and described.

2. The combination of the beam, the supporting-legs, the side arms, the platform, the legs or supports J, the supports L, cross-lever, and the tank, substantially as shown.

In testimony whereof we affix our signatures in presence of two witnesses.

WILLIAM FRANKLIN KINGERY.
J. BURDETT CAVANAUGH.

Witnesses:
JESSE HINES,
JAMES A. BOYD.